(12) United States Patent
Yamada et al.

(10) Patent No.: US 11,052,830 B2
(45) Date of Patent: Jul. 6, 2021

(54) DISPLAY HOLDER

(71) Applicant: TOYOTA JIDOSHA KABUSHIKI KAISHA, Toyota (JP)

(72) Inventors: Takako Yamada, Nagoya (JP);
Yasuhisa Fujiwara, Miyoshi (JP);
Yoshinari Maeda, Tajimi (JP);
Yukinori Kawamura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 16/381,061

(22) Filed: Apr. 11, 2019

(65) Prior Publication Data
US 2019/0329715 A1 Oct. 31, 2019

(30) Foreign Application Priority Data
Apr. 26, 2018 (JP) .............................. JP2018-085005

(51) Int. Cl.
*B60R 11/02* (2006.01)
*B60R 11/00* (2006.01)

(52) U.S. Cl.
CPC ....... *B60R 11/0235* (2013.01); *B60R 11/0241* (2013.01); *B60R 11/0252* (2013.01); *B60R 2011/0005* (2013.01); *B60R 2011/0071* (2013.01); *B60R 2011/0082* (2013.01)

(58) Field of Classification Search
CPC . B60R 11/02; B60R 11/0235; B60R 11/0252; B60R 11/0241; B60R 11/0229; B60R 11/0258; B60R 2011/027; B60R 2011/0005; B60R 2011/0294; B60R 2011/0071; B60R 2011/0082; Y10S 224/929

USPC .......................... 224/552, 929, 456, 536, 570
See application file for complete search history.

(56) References Cited

U.S. PATENT DOCUMENTS

| 5,030,129 A * | 7/1991 | Koch ...................... B60R 11/02 439/140 |
| 5,331,580 A * | 7/1994 | Miller .................... B60R 11/02 708/173 |
| 5,457,745 A | 10/1995 | Wang |
| 6,243,463 B1* | 6/2001 | Cheon ................. B60R 11/0241 379/446 |
| 8,998,048 B1* | 4/2015 | Wu ........................ F16M 11/10 224/420 |
| 9,014,393 B2* | 4/2015 | Huh ........................ B60R 11/02 381/87 |
| 10,391,950 B2* | 8/2019 | Vander Sluis .......... B60R 11/02 |
| 2011/0267759 A1* | 11/2011 | Abram ................ B60R 11/0235 361/679.27 |

(Continued)

FOREIGN PATENT DOCUMENTS

JP 2016-500353 A 1/2016

*Primary Examiner* — Scott T McNurlen
(74) *Attorney, Agent, or Firm* — Oliff PLC

(57) ABSTRACT

A display holder includes a display mounting stand on which a display is to be placed. The display mounting stand includes a lower holding portion configured to support the display from below, a supporting wall configured to face a back surface of the display, and a pair of stoppers configured to project from the supporting wall toward a display side. The stoppers are arranged with a specified distance between the stoppers in a width direction, and configured to be accommodated in the display mounting stand.

11 Claims, 7 Drawing Sheets

(56) References Cited

U.S. PATENT DOCUMENTS

| | | |
|---|---|---|
| 2014/0138419 A1 | 5/2014 | Minn et al. |
| 2015/0333789 A1 | 11/2015 | An |
| 2015/0343962 A1 | 12/2015 | Le Leizour et al. |

* cited by examiner

DISPLAY HOLDER

INCORPORATION BY REFERENCE

The disclosure of Japanese Patent Application No. 2018-085005 filed on Apr. 26, 2018 including the specification, drawings and abstract is incorporated herein by reference in its entirety.

BACKGROUND

1. Technical Field

The present disclosure relates to a display holder.

2. Description of Related Art

There have been known display holders installed in vehicles, and including display mounting stands on which displays such as smartphones, tablet computers, or the like can be placed. For example, Published Japanese Translation of PCT application No. 2016-500353 discloses a display holder designed such that a display mounting stand is pulled out from an instrument panel of a vehicle.

SUMMARY

Regarding a display holder mounted on a vehicle, there is a demand for selectively using different displays with different screen sizes, for example, placing a smartphone in some cases, and placing a tablet computer in other cases. That is, it is desired to provide such a display holder capable of holding a display on a display mounting stand, as well as accepting placement of a display having a different screen size.

A first aspect of the present disclosure is a display holder. The display holder includes a display mounting stand on which a display is to be placed. The display mounting stand includes a lower holding portion configured to support the display from below, a supporting wall configured to face a back surface of the display, and a pair of stoppers configured to project from the supporting wall toward a display side. The stoppers are configured to be arranged with a specified distance in a width direction between the stoppers, and to be accommodated in the display mounting stand.

According to the first aspect, when the display having a size in the width direction within the specified distance is placed on the display mounting stand, the stoppers can restrict movement in the width direction of the display.

On the other hand, when the display having a size in the width direction greater than the specified distance is placed on the display mounting stand, the stoppers projecting from the supporting wall might come in contact with the back surface of the display, so that the placement of the display might become unstable. To cope with this, according to the above first aspect, the stoppers can be accommodated in the display mounting stand; therefore, when the display having a size in the width direction greater than the specified distance is placed on the display mounting stand, it is possible to suppress the stoppers from hindering the placement of the display.

With this configuration, it is possible to hold the display having a size in the width direction within the specified distance, and also possible to attain stable placement of the display when the display having a size in the width direction greater than the specified distance.

In the above first aspect, the stoppers might be urged by elastic members so that stoppers project toward the display side from through-holes opening in the supporting wall, and the elastic members might be included in the display mounting stand.

According to the above configuration, the stoppers can be accommodated by applying a force greater than an urging force by the elastic members to the stoppers. That is, when the display having a size in the width direction greater than the specified distance is placed on the display mounting stand, the stoppers are pressed by the back surface of the display so as to be accommodated into the supporting wall.

In the above first aspect, the display mounting stand may include an upper holding portion configured to support the display from above, and a displacement mechanism configured to displace the upper holding portion relative to the lower holding portion so as to change a distance between the lower holding portion and the upper holding portion.

In the above first aspect, the displacement mechanism may be provided at a position sandwiched between the stoppers in the width direction.

According to the above configuration, since the displacement mechanism is provided between the stoppers, it is possible to suppress increase in size in the width direction of the display mounting stand, as compared with the case of not providing the displacement mechanism between the stoppers.

In the above first aspect, the display mounting stand may include an auxiliary arm configured to hold, in the width direction, a display having a size in the width direction greater than the specified distance.

According to the above configuration, it is possible to suppress movement in the width direction of the display having a size in the width direction greater than the specified distance.

In the above first aspect, the display holder may be configured to be fixed to an instrument panel of a vehicle.

In the above first aspect, the auxiliary arm may be a movable arm configured to change the distance of the auxiliary arm in the width direction.

In the above first aspect, the lower holding portion may include a lower holding piece configured to suppress the display from coming off the lower holding portion.

In the above first aspect, the stoppers may be configured to be accommodated into the display mounting stand when the stoppers are pushed toward a direction opposite to the display side by the display having the size in the width direction greater than the specified distance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
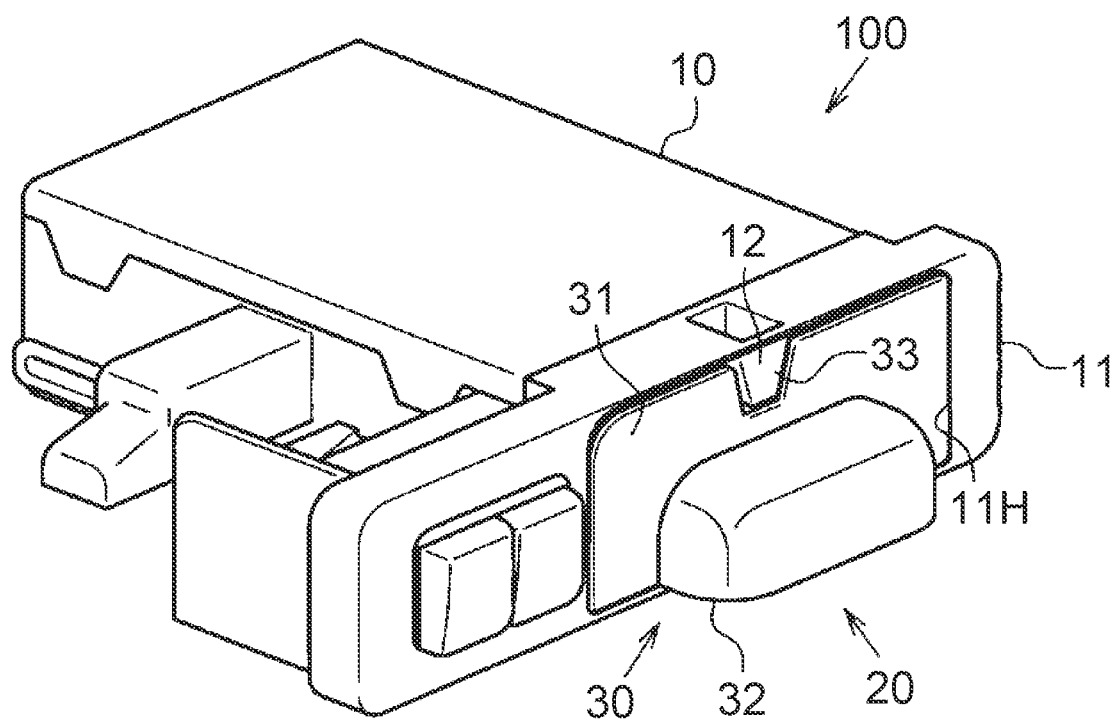
FIG. 1 is a perspective view showing a state in which a display mounting stand is accommodated, as one embodiment of a display holder.

Hereinafter, one embodiment of a display holder will be described with reference to FIG. 1 to FIG. 6. FIG. 1 shows the display holder 100 in a state in which a display mounting stand 20 is accommodated in an accommodating part 10.

The accommodating part 10 has a box-like shape, and is fixed to an instrument panel of a vehicle. The accommodating part 10 has an aperture 11 having a pull-out port 11H in a quadrangular shape facing a vehicle cabin. The aperture 11 includes a projection 12 projecting downward in the drawing, toward the inside of the pull-out port 11H. The projection 12 has an inverse trapezoid shape with a bottom portion that is an edge of the pull-out port 11H. The accommodating part 10 can store the display mounting stand 20 in an inner space in its box-like shape.

The display mounting stand 20 includes an operating part 30. The operating part 30 includes a front surface wall 31 and a handle 32. The front surface wall 31 configures a front surface of the display mounting stand 20 accommodated in the accommodating part 10. The operating part 30 includes a first cutout 33. The first cutout 33 is located at a peripheral edge of the front surface wall 31, and opens toward an upper edge of the aperture 11. The outer shape of the first cutout 33 coincides with the outer shape of the projection 12, as viewed from a direction opposite to the pull-out port 11H. As shown in FIG. 1, in a state in which the display mounting stand 20 is accommodated in the accommodating part 10, the first cutout 33 is filled by the projection 12. The entire pull-out port 11H is filled by the front surface wall 31. When the entire pull-out port 11H is filled by the front surface wall 31, a continuous surface is formed by the aperture 11 and the operating part 30.

The handle 32 is formed to swell out from the front surface wall 31 in a half-bowl shape with an opening facing downward in the drawing, and is designed to allow a finger or the like to be inserted in the handle from below. The handle 32 is used for pulling out the display mounting stand 20 from the accommodating part 10, and pushing the pulled-out display mounting stand 20 into the accommodating part 10. In addition, the handle 32 is also used for displacing the display mounting stand 20 from a laid-down posture to an upright posture, as described later.

Figure 2:
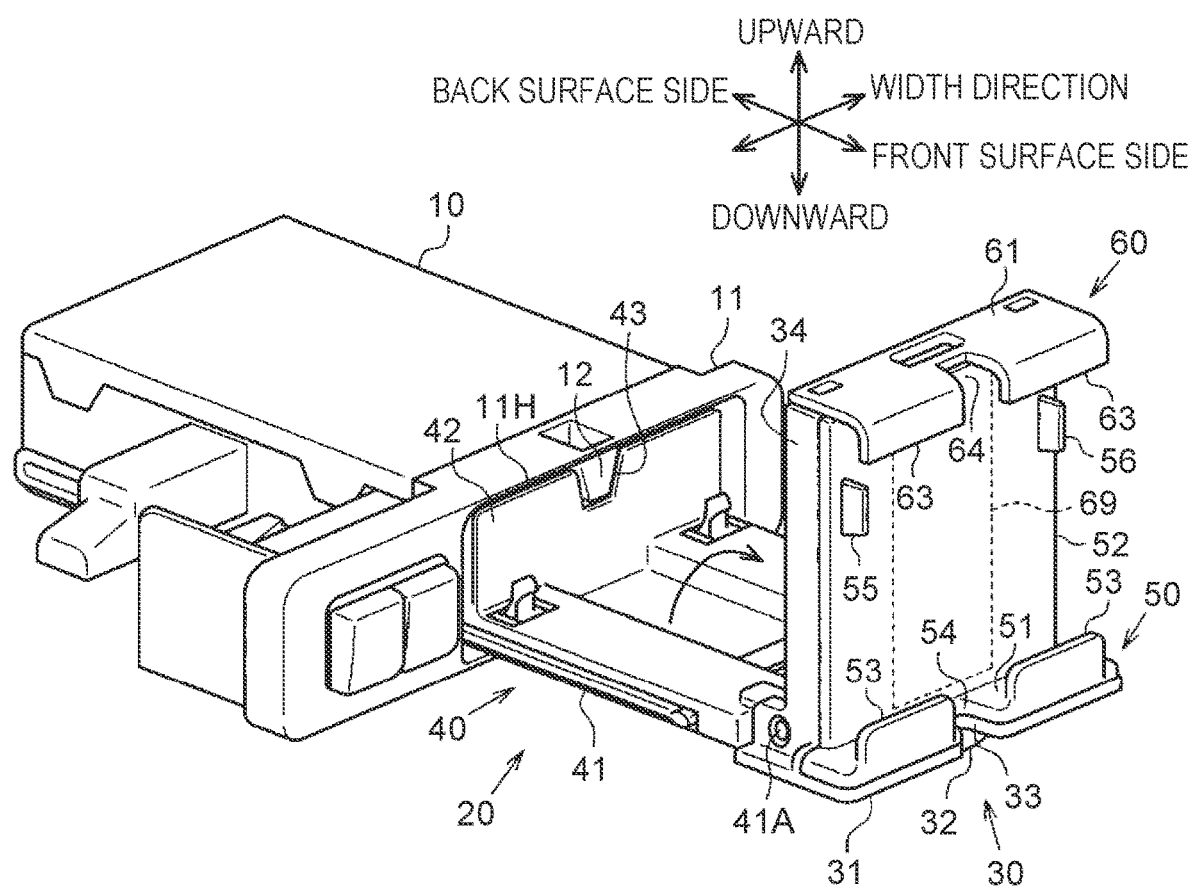
FIG. 2 is a perspective view showing a state in which the display mounting stand of the display holder according to this embodiment is pulled out.

FIG. 2 shows a state in which the display mounting stand 20 is pulled out from the accommodating part 10. The display holder 100 includes a translation base 40. The display holder 100 is configured by the accommodating part 10, the display mounting stand 20, and the translation base 40. The translation base 40 includes a translation plate 41 and a closing wall 42.

The translation plate 41 has a rectangular plate-like shape that can be accommodated in the accommodating part 10, and has a size small enough to pass through the pull-out port 11H of the aperture 11. The translation plate 41 allows pull-out of the translation base 40 from the accommodating part 10 toward the inside of the vehicle cabin, and push-in of the translation base 40 from the inside of the vehicle cabin toward the accommodating part 10. The translation plate 41 includes a rotating shaft 41A at the end on the vehicle cabin side. The display mounting stand 20 is coupled to the rotating shaft 41A of the translation plate 41 in such a manner as to turn between the posture in which the display mounting stand 20 is laid down along the translation plate 41 (laid-down posture) and the posture in which the display mounting stand 20 stands up (upright posture). The display mounting stand 20 is accommodated in the laid-down posture together with the translation plate 41 in the accommodating part 10. The display mounting stand 20 is pulled out in the laid-down posture together with the translation plate 41 from the accommodating part 10, and is then turned in an arrow direction in the drawing and is then displaced to the upright posture.

FIG. 2 shows arrows respectively indicating a direction in which the display mounting stand 20 is pulled out from the accommodating part 10 and a direction in which the display mounting stand 20 is pushed into the accommodating part 10. In the arrows, the direction in which the display mounting stand 20 is pulled out is defined as a front surface side, and the direction in which the display mounting stand 20 is pushed in is defined as a back surface side.

The closing wall 42 is provided at an end of the translation plate 41 located on the back surface side. The closing wall 42 configures a back surface of the translation base 40. The closing wall 42 includes a fourth cutout 43. The fourth cutout 43 is located on a periphery of the closing wall 42, and opens toward the upper edge of the aperture 11. The outer shape of the fourth cutout 43 coincides with the outer shape of the projection 12 when seen from the direction opposite to the pull-out port 11H. The fourth cutout 43 is filled by the projection 12. As shown in FIG. 2, in a state in which the display mounting stand 20 is pulled out from the accommodating part 10, the entire pull-out port 11H is filled by the closing wall 42.

The operating part 30 includes a back surface portion 34. The back surface portion 34 extends upward from the front surface wall 31, in the display mounting stand 20 in the upright posture as shown in FIG. 2. In the display mounting stand 20 in the upright posture, the back surface portion 34 configures a surface facing the aperture 11, that is, a back surface of the display mounting stand 20. In the display mounting stand 20 in the laid-down posture, a back surface of the back surface portion 34 and an upper surface of the translation plate 41 face each other.

The display mounting stand 20 includes a lower holding portion 50 and an upper holding portion 60. The display holder 100 can sandwich the display by the lower holding portion 50 located at a perpendicularly lower position in the display mounting stand 20 in the upright posture, and the upper holding portion 60 located at a perpendicularly upper position. FIG. 2 shows arrows indicating an up-down direction.

The lower holding portion 50 includes a lower holding wall 51, a supporting wall 52, and a pair of lower holding pieces 53. In the upright posture shown in FIG. 2, the lower holding wall 51 is fixed in surface contact with an upper surface of the front surface wall 31 of the operating part 30. The lower holding wall 51 includes a second cutout 54. The outer shape of the second cutout 54 coincides with the outer shape of the first cutout 33 of the front surface wall 31, as viewed in the up-down direction. Respective openings of the first and second cutouts 33, 54 face in a direction in which the display mounting stand 20 is pulled out, that is, face toward the front surface side. When the display mounting stand 20 in the laid-down posture passes through the pull-out port 11H, the projection 12 at the aperture 11 can pass through the first and second cutouts 33, 54.

In the upright posture shown in FIG. 2, the supporting wall 52 extends upward from an end of the lower holding wall 51 on the back surface side. The supporting wall 52 is fixed to the back surface portion 34 on the front surface side. In the upright posture shown in FIG. 2, the lower holding pieces 53 project upward from the end of the lower holding wall 51 on the front surface side. The lower holding pieces 53 are arranged with the opening of the second cutout 54 interposed therebetween. FIG. 2 shows arrows indicating that a direction in which the lower holding pieces 53 and the second cutout 54 are arranged is defined as a width direction.

As shown in FIG. 2, the upper holding portion 60 is located more upward than an upper end of the back surface portion 34 in the display mounting stand 20 in the upright posture. The upper holding portion 60 is fixed to a displacement mechanism 69 included in the back surface portion 34. The upper holding portion 60 is configured to be extendable in the upward direction by the displacement mechanism 69.

The upper holding portion 60 includes an upper holding wall 61 and a pair of upper holding pieces 63. The upper holding wall 61 includes a third cutout 64. The outer shape of the third cutout 64 coincides with the outer shapes of the first and second cutouts 33, 54, as seen from the up-down direction in the upright posture shown in FIG. 2. An opening of the third cutout 64 faces toward the front surface side.

In the upright posture shown in FIG. 2, the upper holding pieces 63 project downward from an end of the upper holding wall 61 on the front surface side. The upper holding pieces 63 are arranged in the width direction with the opening of the third cutout 64 interposed therebetween. When the display mounting stand 20 in the laid-down posture passes through the pull-out port 11H, the projection 12 of the aperture 11 can pass through the third cutout 64.

Figure 3:
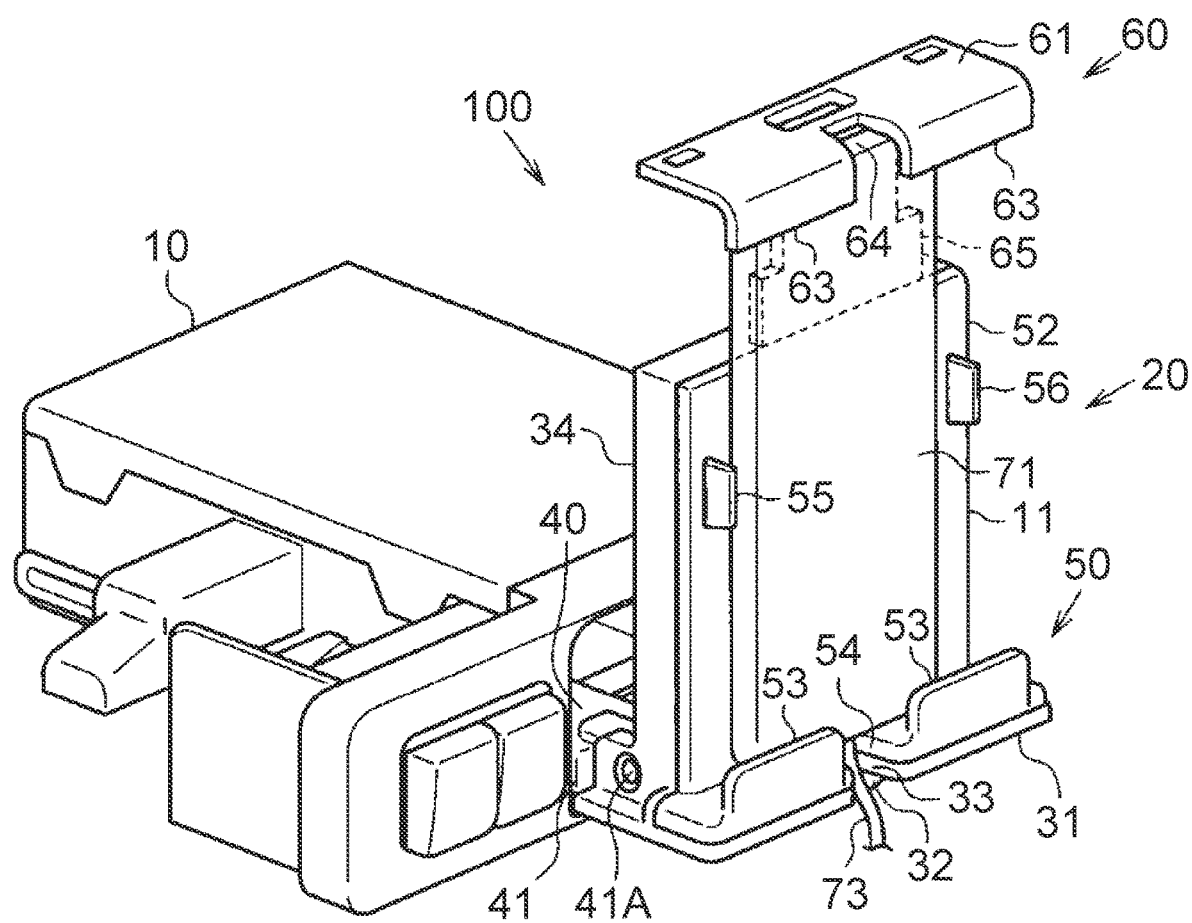
FIG. 3 is a perspective view showing a state in which the display mounting stand of the display holder according to this embodiment is extended.

FIG. 3 shows that the display mounting stand 20 is in the upright posture, and the translation base 40 is moved from the state shown in FIG. 2 toward the back surface side, and the translation base 40 is then pushed in the accommodating part 10. FIG. 3 further shows a state in which the upper holding portion 60 is extended upward by the displacement mechanism 69. An extending wall 65 configuring the displacement mechanism 69 is connected to the upper holding wall 61. The extending wall 65 is displaced upward, and the upper holding portion 60 is thereby displaced upward relative to the lower holding portion 50. The upper holding portion 60 is displaced relative to the lower holding portion 50 in the up-down direction, to thereby change a distance between the upper holding portion 60 and the lower holding portion 50. The displacement mechanism 69 includes a fixing mechanism that can fix the position of the extending wall 65 in a state in which the upper holding portion 60 is displaced upward.

FIG. 3 shows a first display 71 as one example of the display placed on the display mounting stand 20 in the upright posture. The lower holding wall 51 supports the first display 71 from below. The supporting wall 52 faces a back surface of the first display 71. The pair of lower holding pieces 53 suppresses a lower edge of the first display 71 from coming off the lower holding wall 51. The upper holding wall 61 supports the first display 71 from above. The pair of upper holding pieces 63 suppresses an upper edge of the first display 71 from coming off the upper holding wall 61. Examples of the display placed on the display mounting stand 20 may include a smartphone, a tablet computer, and others.

As shown in FIG. 2 and FIG. 3, the display mounting stand 20 includes a first stopper 55 and a second stopper 56 arranged in the width direction, as a pair of stoppers. The first stopper 55 and the second stopper 56 project from a surface on the front surface side of the supporting wall 52 toward the front surface side.

Figure 4:
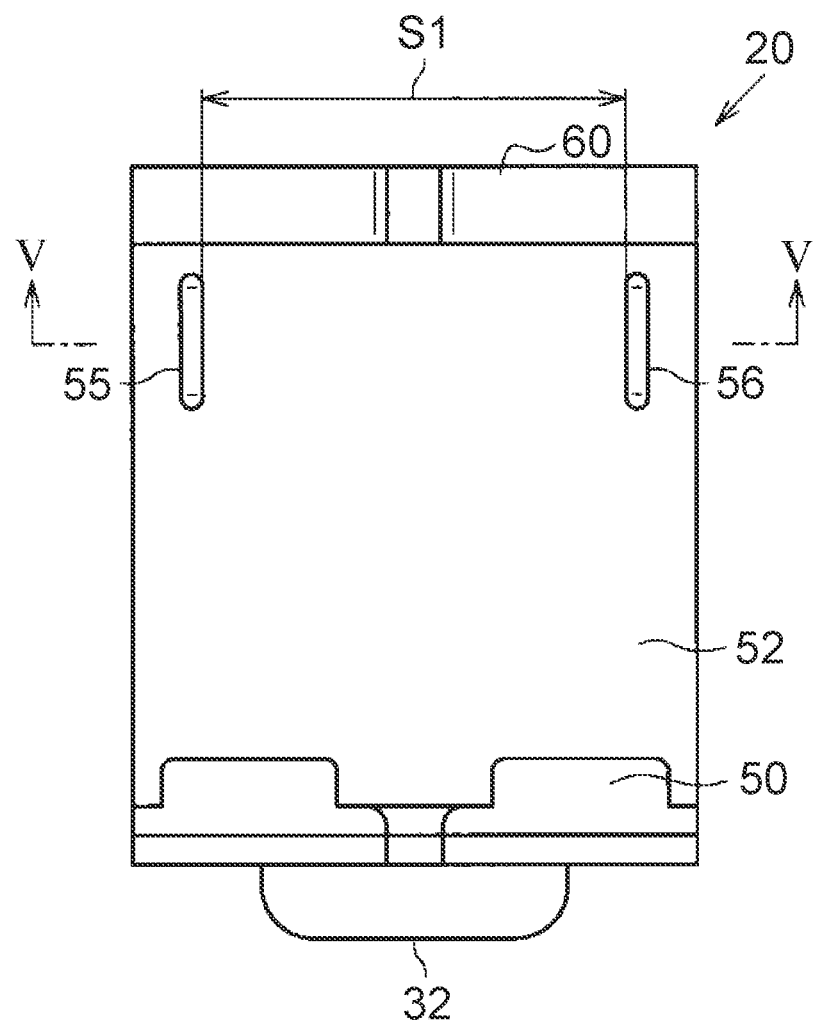
FIG. 4 is a front view showing the display mounting stand of the display holder according to this embodiment.

FIG. 4 shows the display mounting stand 20 seen from the front surface side. FIG. 4 shows, as a stopper distance S1, a size of a distance between a surface of the first stopper 55 on the second stopper 56 side and a surface of the second stopper 56 on the first stopper 55 side. The stopper distance S1 is one example of a specified distance in the present disclosure.

As shown in FIG. 2 to FIG. 4, the first stopper 55 and the second stopper 56 are located closer to the upper holding portion 60 from the center of the supporting wall 52 in the up-down direction. The first stopper 55 and the second stopper 56 are extendedly arranged in the up-down direction while the stopper distance S1 is maintained.

Figure 5:
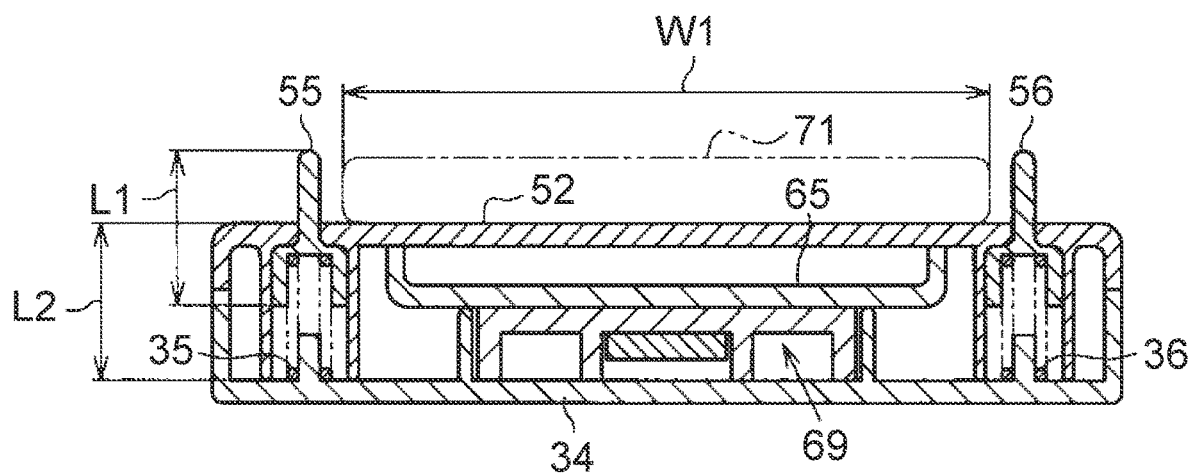
FIG. 5 is a sectional view taken along line V-V in FIG. 4.

As shown in FIG. 5, each of the first stopper 55 and the second stopper 56 is configured by a base portion disposed between the supporting wall 52 and the back surface portion 34, and a front end pin portion provided to extend from the base portion so as to be projected or retracted from the supporting wall 52.

As shown in FIG. 5, between the supporting wall 52 and the back surface portion 34, a first spring 35 and a second spring 36 as elastic members are arranged. Both ends of the first spring 35 are connected to the base portion of the first stopper 55 and the back surface portion 34. Both ends of the second spring 36 are connected to the base portion of the second stopper 56 and the back surface portion 34.

Between the supporting wall 52 and the back surface portion 34, each of the base portion of the first stopper 55 and the base portion of the second stopper 56 is provided with side walls on both sides thereof in the width direction. Through-holes through which the front end pin portion of the first stopper 55 and the front end pin portion of the second stopper 56 respectively project are opened in the supporting wall 52.

The first stopper 55 is urged by the first spring 35 toward the projecting direction. The first stopper 55 projects from the supporting wall 52 through the through-hole. The second stopper 56 is urged by the second spring 36 toward the projecting direction. The second stopper 56 projects from the supporting wall 52 through the through-hole.

FIG. 5 shows a first display 71 as a display in a specified size having a size in the width direction equal to a lateral width W1. The lateral width W1 is smaller than the stopper distance S1. The display in the specified size denotes a display having a size in the lateral direction equal to the lateral width W1, and having a size in the vertical direction that is greater than the lateral width W1. The size in the vertical direction is greater than the stopper distance S1. As shown in FIG. 3, when the display is placed on the display mounting stand 20 such that a smaller side of a vertical side and a lateral side of the display is positioned along the width direction, this placement is referred to as a vertical placement. On the other hand, when the display is placed on the display mounting stand 20 such that the other greater side is positioned along the width direction, this placement is referred to as a lateral placement.

The stopper distance S1 is set as a distance in which, when a display having a size in the width direction within the stopper distance S1 is placed on the display mounting stand 20, the first stopper 55 and the second stopper 56 can restrict the movement of the display in the width direction.

Here, as shown in FIG. 5, in the first stopper 55, a length from an end of the front end pin portion on the front surface side to an end of the base portion on the back surface side is defined as a stopper length L1. In the display mounting stand 20, a length from a surface of the back surface portion 34 facing the supporting wall 52 to a surface of the supporting wall 52 on the front surface side is defined as a space width L2. The first stopper 55 and the display mounting stand 20 are configured such that the stopper length L1 is not longer than the space width L2. The second stopper 56 and the display mounting stand 20 have the same length relationship, as well.

Figure 6:
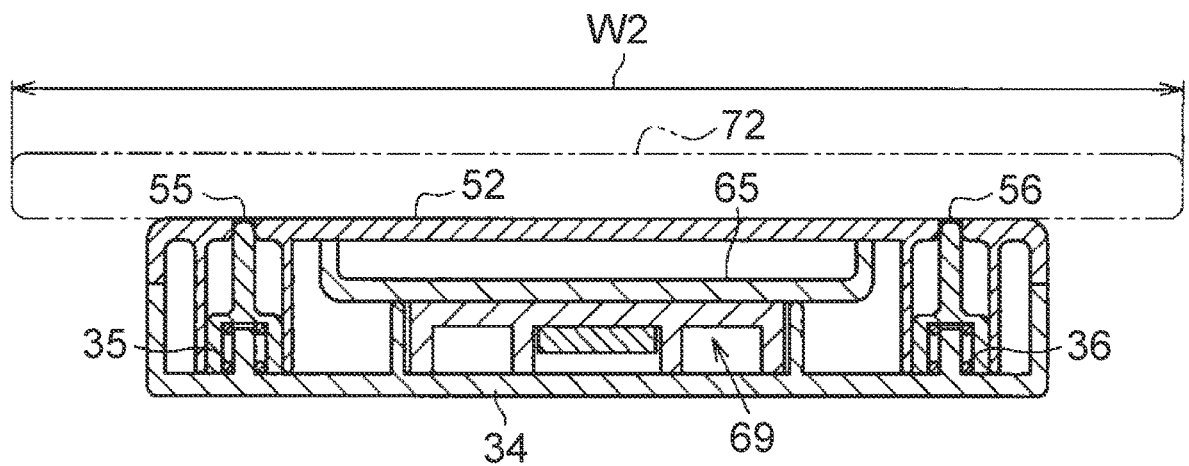
FIG. 6 is a sectional view showing a state in which stoppers included in the display holder according to this embodiment are accommodated.

As shown in FIG. 6, the first stopper 55 and the second stopper 56 can be accommodated in the display mounting stand 20. When an urging force greater than the urging force of the first spring 35 and the second spring 36 is applied from the front surface side to the first stopper 55 and the second stopper 56, the first stopper 55 and the second stopper 56 are moved toward the back surface side to be accommodated between the supporting wall 52 and the back surface portion 34. At this time, the respective base portions of the first stopper 55 and the second stopper 56 slide between the side walls located on the both sides in the width direction of these base portions. The stopper length L1 shown in FIG. 5 is a length not longer than the space width L2; therefore, the respective ends on the front surface side of the front end pin portions of the first stopper 55 and the second stopper 56 do not project from the supporting wall 52 when they are moved to the backmost side.

FIG. 6 shows a second display 72, as a display having a size in the width direction equal to a lateral width W2 greater than the stopper distance S1. For example, when the first stopper 55 and the second stopper 56 are pushed toward the back surface side by the back surface of the second display 72, the first stopper 55 and the second stopper 56 are moved toward the back surface side to be accommodated in the display mounting stand 20.

As shown in FIG. 5 and FIG. 6, between the supporting wall 52 and the back surface portion 34, the displacement mechanism 69 including the extending wall 65 is provided. The displacement mechanism 69 is provided at a position between the first stopper 55 and the second stopper 56 in the width direction.

The operation and effects of the present embodiment will be described below. In the display holder 100, the first stopper 55 and the second stopper 56, as a pair of stoppers provided with the stopper distance S1 interposed in the width direction therebetween, project from the supporting wall 52 of the display mounting stand 20. Therefore, in the same way as the vertical placement of the display having the specified size on the display mounting stand 20 as exemplified in FIG. 3, when the display having the size in the width direction within the stopper distance S1 is placed on the display mounting stand 20, the displacement of the display in the width direction can be restricted by the first stopper 55 and the second stopper 56.

In addition, in the display holder 100, the first stopper 55 and the second stopper 56 can be accommodated in the display mounting stand 20. Therefore, when the display placed on the display mounting stand 20 has a size in the width direction greater than the stopper distance S1, as with the second display 72 exemplified in FIG. 6, the first stopper 55 and the second stopper 56 can be prevented from interrupting the placement of the display by accommodating the first stopper 55 and the second stopper 56.

In this manner, the display holder 100 can accept even a display greater in the width direction than a display in the specified size. That is, it is possible to accept a display having a different screen size.

Moreover, even if the display placed on the display mounting stand 20 is a display in the specified size, when this display is laterally placed, the size in the width direction thereof is greater than the stopper distance S1. Also in this case, according to the display holder 100, the first stopper 55 and the second stopper 56 can be accommodated, and thus it is possible to accept the lateral placement of the display. Specifically, as with the case of placing a display greater in the width direction than the display in the specified size, the first stopper 55 and the second stopper 56 can be prevented from hindering the placement of the display by accommodating the first stopper 55 and the second stopper 56 in the display mounting stand 20.

In addition, in the display holder 100, the first stopper 55 and the second stopper 56 are urged toward the projecting direction by the first spring 35 and the second spring 36. Accordingly, the first stopper 55 and the second stopper 56 can be accommodated simply by pressing the first stopper 55 and the second stopper 56 by the back surface of the display.

In the display holder 100, the distance between the lower holding portion 50 and the upper holding portion 60 is configured to be changeable. Accordingly, in the display mounting stand 20 in the upright posture, when the upper holding portion 60 is pulled up, the display can be placed between the lower holding portion 50 and the upper holding portion 60. By displacing the upper holding portion 60 downward so as to bring the upper holding portion 60 to come in contact with the upper edge of the display, the display can be held between the lower holding portion 50 and the upper holding portion 60. By sandwiching and fixing the display in this manner, it is possible to suppress the display from coming off due to vibrations generated during traveling of the vehicle.

Depending on the length of the display placed on the display mounting stand 20, the length ranging from the front surface side to the back surface side of the display, that is, the thickness of the display, the first stopper 55 and the second stopper 56 might not be moved to the backmost surface side when the display is sandwiched by the lower holding portion 50 and the upper holding portion 60 in some cases. Even in this case, the first stopper 55 and the second stopper 56, which are provided to be movable toward the back surface side, can have reduced projection lengths from the supporting wall 52 so as not to hinder the placement of the display. That is, the first stopper 55 and the second stopper 56 are suppressed from hindering the placement of the display.

Furthermore, in the display holder 100, the displacement mechanism 69 that displaces the upper holding portion 60 is disposed between the first stopper 55 and the second stopper 56 in the width direction. Accordingly, as compared with the case of providing the displacement mechanism 69 outward of the first stopper 55 and the second stopper 56 in the width direction, it is possible to suppress increase in length in the width direction of the display mounting stand 20.

In the display holder 100, the lower holding portion 50, which supports the lower part of the display when the display is placed on the display mounting stand 20, is provided with the second cutout 54, and the operating part 30 is provided with the first cutout 33. As shown in FIG. 3, this configuration enables a cable 73 detachable to the display to be connected to the display from below the lower holding portion 50 through the first and second cutouts 33, 54. As the cable 73, for example, a power-supply cable used for connecting the display to an external power source, a signal cable that can transmit and receive data between the display and an external terminal, and others might be listed.

Figure 7:
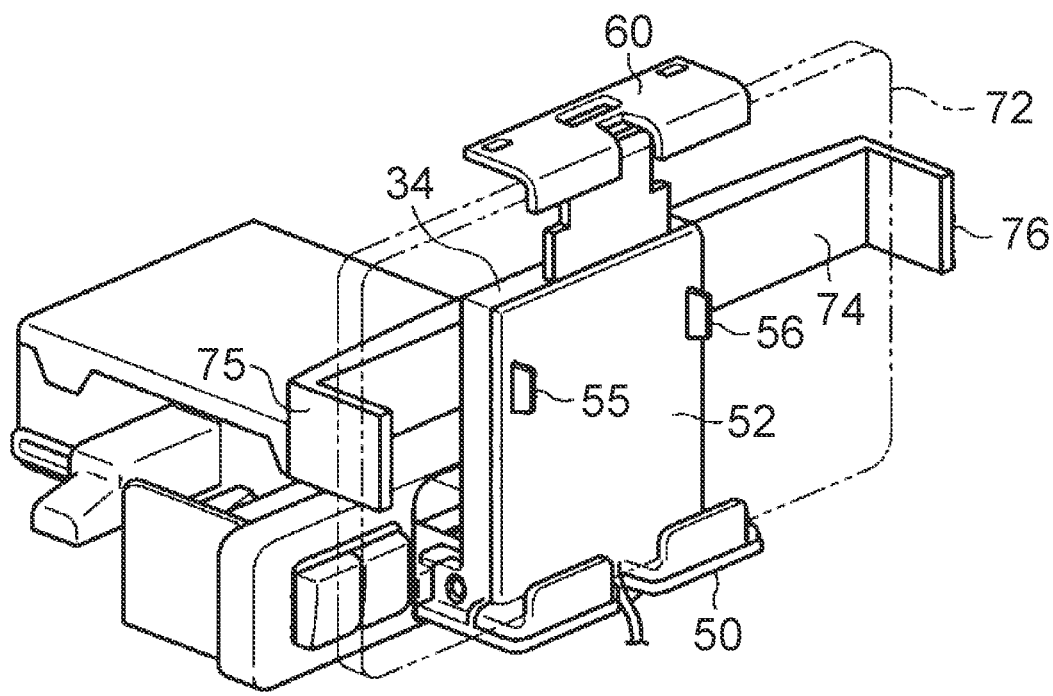
FIG. 7 is a perspective view showing a variation of the display holder.

As shown in FIG. 7, an auxiliary arm 74 may be attached to the back surface portion 34 of the display mounting stand 20. The auxiliary arm 74 includes a first holding piece 75 and a second holding piece 76 on both ends of the auxiliary arm 74 extending in the width direction. The first holding piece 75 and the second holding piece 76 project toward the front surface side. For example, a fixing piece provided to the back surface portion 34 is fitted into a fixing hole located at the center in the width direction of the auxiliary arm 74 so as to fix the auxiliary arm 74 to the back surface portion 34.

When a display greater in the width direction than the stopper distance S1 is placed on the display mounting stand 20, a distance between the first holding piece 75 and the second holding piece 76 is set in such a manner that the display is sandwiched between the first holding piece 75 and the second holding piece 76 in the width direction, to thereby realize holding of the display using the auxiliary arm 74.

In addition, as the auxiliary arm 74, a movable arm that can change the distance between the first holding piece 75 and the second holding piece 76 may also be employed. In this case, the arm can also be accommodated in the accommodating part 10.

In the above embodiment, the displacement mechanism 69 is disposed between the first stopper 55 and the second stopper 56 in the width direction. It is not always necessary to provide the displacement mechanism 69 between the first stopper 55 and the second stopper 56.

In the above embodiment, the projection 12 included in the accommodating part 10, the first, second, and third cutouts 33, 54, 64 included in the display mounting stand 20, and the fourth cutout 43 included in the translation base 40 are not essential configurations. For example, the second cutout 54 may be omitted, and the lower holding pieces 53 may be configured to be continuous in the width direction.

The stopper distance S1 in the above embodiment may appropriately be set depending on the screen size of the display to be placed. That is, the positions where the first stopper 55 and the second stopper 56 are disposed can be changed.

In the above embodiment, a shape extending in the up-down direction is adapted in each of the first stopper 55 and the second stopper 56. Each shape of the first stopper 55 and the second stopper 56 can be changed, and may be a projection in a columnar shape, a square pillar, or the like, for example.

In the above embodiment, the first stopper 55 and the second stopper 56 are independently provided, but the first stopper 55 and the second stopper 56 may be coupled to each other between the supporting wall 52 and the back surface portion 34.

In the above embodiment, although the pair of stoppers including the first stopper 55 and the second stopper 56 is provided, three or more stoppers may be provided, instead. For example, stoppers are further provided respectively below the first stopper 55 and the second stopper 56, to thereby provide two pairs of stoppers. Stoppers may further be provided outward of the first stopper 55 and the second stopper 56 in the width direction. In this manner, multiple pairs of stoppers may be provided.

In addition, as far as at least one pair of stoppers is provided, an odd number of stoppers may be provided. In the above embodiment, there has been exemplified the display holder 100 configured by the accommodating part 10, the display mounting stand 20, and the translation base 40. The display holder may be configured by the display mounting stand and a connection part that connects the back surface of the display mounting stand to the instrument panel of the vehicle. With the configuration of the stoppers projecting from the supporting wall facing the back surface of the display and configured to be accommodated in the display mounting stand, it is possible to attain effect to hold the display by the pair of stoppers, and also attain effect to suppress the stoppers from hindering placement of a display having a greater screen size when the display is placed, as with the above embodiments.

What is claimed is:
1. A display holder, comprising:
   a display mounting stand on which a display is to be placed, the display mounting stand including
      a lower holding portion configured to support the display from below,
      a supporting wall configured to face a back surface of the display,
      a pair of stoppers configured to project from the supporting wall toward a display side, and
      an operating part that includes a front surface wall having a first cutout; and
   an accommodating part configured to accommodate the display mounting stand, the accommodating part including an aperture having a projection,
   wherein
   the lower holding portion includes a lower holding wall having a second cutout, an outer shape of the first cutout coinciding with an outer shape of the second cutout,
   the stoppers are arranged with a specified distance between the stoppers in a width direction, and configured to be accommodated in the display mounting stand,
   the projection configured to pass through the first cutout and the second cutout when the display mounting stand is accommodated by the accommodating part.

2. The display holder according to claim 1, wherein the stoppers are urged by elastic members so that the stoppers project toward the display side from through-holes opening in the supporting wall, and the elastic members are included in the display mounting stand.

3. The display holder according to claim 1, wherein the display mounting stand includes
   an upper holding portion configured to support the display from above, and
   a displacement mechanism configured to displace the upper holding portion relative to the lower holding portion so as to change a distance between the lower holding portion and the upper holding portion.

4. The display holder according to claim 3, wherein the displacement mechanism is provided at a position sandwiched between the stoppers in the width direction.

5. The display holder according to claim 1, wherein the display mounting stand includes an auxiliary arm configured to hold, in the width direction, a display having a size in the width direction greater than the distance.

6. The display holder according to claim 5, wherein the auxiliary arm is a movable arm configured to change a position of the auxiliary arm in the width direction.

7. The display holder according to claim 5, wherein the stoppers are configured to be accommodated into the display mounting stand when the stoppers are pushed toward a direction opposite to the display side by the display having the size in the width direction greater than the specified distance.

8. The display holder according to claim 1, wherein the display holder is configured to be fixed to an instrument panel of a vehicle.

9. The display holder according to claim 1, wherein the lower holding portion includes a lower holding piece configured to suppress the display from coming off the lower holding portion.

10. The display holder according to claim 1, wherein the display mounting stand includes an auxiliary arm configured to hold, in the width direction, a display having a size in the width direction greater than the specified distance.

11. A display holder, comprising:
a display mounting stand on which a display is to be placed, the display mounting stand including
a lower holding portion configured to support the display from below,
an upper holding portion configured to support the display from above, and
a displacement mechanism configured to displace the upper holding portion relative to the lower holding portion so as to change a distance between the lower holding portion and the upper holding portion,
a supporting wall configured to face a back surface of the display,
a pair of stoppers configured to project from the supporting wall toward a display side, and
an operating part that includes a front surface wall having a first cutout; and
an accommodating part configured to accommodate the display mounting stand, the accommodating part including an aperture having a projection,
wherein
the lower holding portion includes a lower holding wall having a second cutout, an outer shape of the first cutout coinciding with an outer shape of the second cutout,
the projection configured to pass through the first cutout and the second cutout when the display mounting stand is accommodated by the accommodating part, and
the stoppers are placed at positions whereby when the display having a size within a specified distance in the width direction is placed on the display mounting stand, the stoppers are outside, in the width direction, of width direction edges of the display and the stoppers are configured to restrict movement of the display in the width direction.

* * * * *